March 13, 1962 K. J. R. WILKINSON ET AL 3,025,443
DYNAMO-ELECTRIC MACHINES
Filed April 13, 1959 4 Sheets-Sheet 1

Fig.1.

INVENTORS
KENNETH J. R. WILKINSON
JOHN JENKIN MATTHEWS
ATTORNEY

March 13, 1962  K. J. R. WILKINSON ET AL  3,025,443
DYNAMO-ELECTRIC MACHINES
Filed April 13, 1959   4 Sheets-Sheet 2

INVENTORS
KENNETH J.R. WILKINSON
JOHN JENKIN MATTHEWS

ATTORNEY

INVENTORS
KENNETH J. R. WILKINSON
JOHN JENKIN MATTHEWS

ATTORNEY

March 13, 1962    K. J. R. WILKINSON ET AL    3,025,443
DYNAMO-ELECTRIC MACHINES
Filed April 13, 1959    4 Sheets-Sheet 4

INVENTORS
KENNETH J.R. WILKINSON
JOHN JENKIN MATTHEWS
ATTORNEY

United States Patent Office 3,025,443
Patented Mar. 13, 1962

3,025,443
DYNAMO-ELECTRIC MACHINES
Kenneth James Rawcliffe Wilkinson and John Jenkin Matthews, Rugby, England, assignors to The British Thomson-Houston Company Limited, London, England, a company of Great Britain
Filed Apr. 13, 1959, Ser. No. 805,812
Claims priority, application Great Britain Apr. 17, 1958
14 Claims. (Cl. 318—138)

This invention relates to dynamo-electric machines, with particular application to direct current (D.C.) machines but not excluding possible application to alternating current (A.C.) commutator machines.

D. C. machines excel over other kinds where wide speed ranges or rapidly changing loads are involved. In these circumstances, however, commutation by the conventional commutator, with its associated requirements in regard to field compensation, imposes practical limitations of design.

In the most usual form of D.C. machine, armature conductors accommodated in peripherally distributed slots in a rotary armature are connected into a lap-wound or a wave-wound formation with connections taken at appropriate positions to the segments of a commutator engaged by brushes to which armature terminals of the machine are connected, each armature conductor being included in a series connection between two commutator segments (which may or may not be adjacent to each other depending on the winding formation) and through them, via the brushes, between the armature terminals. The function of the commutator and brushes in providing that, in respect of each armature conductor, the sense in which the current flows through it is effectively reversed with respect to the armature terminals as the conductor moves away from the influence of one field pole towards that of the next (of opposite polarity) is well known.

With a view to avoiding the aforementioned limitations imposed by the conventional use of a mechanical commutator, it is now proposed, in accordance with the present invention, to provide commutation for a dynamoelectric machine by means of semi-conductor current switching devices arranged to be alternated between a conductive ("on") state and a substantially non-conductive ("off") state in synchronism with rotation of the machine and with a timing and in a sequence appropriate to producing in the individual armature conductors of the machine periodic current flow in proper direction having regard to the instantaneous positions of these conductors in relation to the magnetic field poles of the machine.

The semi-conductor devices, which may be mounted remotely from the machine or, by virtue of their small size and weight, in the machine frame itself, may be constituted, for example, by controlled semi-conductor diodes (so-called controlled rectifiers or "trigger diodes"), semiconductor triodes (transistors), or photo versions of any of these.

To provide the commutating function each armature current path constituted by the interconnection of the armature conductors may require, for a two-wire D.C. system, four semi-conductor switching devices of which two are connected at opposite ends of the path and are arranged to be conductive together to establish current flow through the path in one direction, and the other two switching devices, also connected at opposite ends of the path, are arranged to be conductive together, when the first two are non-conductive, to establish current flow through the path in the opposite direction.

As an alternative arrangement requiring fewer switching devices, each armature current path may be switched to carry current in one direction only and at such times that each conductor of the path, considered individually, is always under the influence of the same polarity of field when the path is so switched. In this case each path requires only a single switching device connected in series with the path and rendered conductive at appropriate times having regard to the instantaneous positions of the path conductors in relation to the field poles. In this alternative arrangement each armature conductor is being actively influenced by a field pole for only half, or less, of the time, namely only when it is under the influence of a north pole or only when it is under the influence of a south pole: in other words the poles are active in respect of any armature path for only half the time. It may therefore be desirable to pair each armature path with a similarly switched path which has its conductors located adjacent to those of the first path, for instance in the same slots, but connected to carry current in the opposite direction, the second path being switched by its own switching device to carry current alternately with the first. Each current path in this alternative arrangement would carry current only intermittently, but since this means that the current density can be increased, the conductors are not used so uneconomically as might appear at first sight.

In the case of a three-wire D.C. system (positive, negative and neutral) only two semi-conductor switching devices per path may be needed, one end of the path being connected to the neutral terminal and the other end being connected alternately to the positive and negative terminals by alternately rendering the two switching devices conductive; the three terminals would then pass full armature current periodically.

Control of the semi-conductor switching devices in synchronism with rotation of the machine may be effected by means of actuating signals applied to them at appropriate times from some form of electric pick-up device in which such signals are periodically produced by means of a cooperating device rotating with the machine. For instance pick-up coils may have an E.M.F. induced in them in a periodic sequence by a rotating permanent magnet or electromagnet system; or photo-electric devices may produce output signals according as light incident thereon from a light source is periodically masked and unmasked on rotation of the machine, for instance by a disc having alternate sectors opaque; or capacitor probes may respond to the proximity of suitable markers on a part rotating with the machine. In the case of pick-up coils cooperating with a permanent magnet or D.C. excited electromagnet system the insufficiency or absence of induced E.M.F.'s to act as actuating signals at low speeds or standstill may require an auxiliary switching device to be brought into use, for instance by the action of centrifugal force, to apply the periodic actuating signals to the semi-conductor switching devices in such circumstances. Such an auxiliary switching device controlling the operation of the semi-conductor switching devices could, if desired, be used at all speeds, it being emphasised that the auxiliary device merely controls the semi-conductor devices and does not itself carry the armature current which is being commutated. If an A.C. excited electromagnet system were employed in conjunction with pick-up coils, actuating signals could be derived even at standstill and low speeds, as they can also be with the other forms of pick-up device mentioned.

By using the semi-conductor switching devices for effecting commutation instead of a conventional mechanical commutator, the mechanical speed limitation imposed by the latter is removed. Moreover there is then no need for the rotor of the machine to be the armature and it is contemplated that it would therefore be convenient in carrying out the invention for the machine to have a stator armature and a rotor field system, the latter being fed with exciting direct current or being constituted by a permanent magnet rotor.

In a conventional D.C. machine transfer of current takes place between each segment and a brush for only a brief time during each revolution. However, a semi-conductor switching device handles its maximum power load when its alternate on and off periods are approximately equal. It is therefore preferred, in carrying out the invention, to connect the armature conductors in a number of paths connected in parallel through the switching devices between the armature terminals, each path preferably including a number of armature conductors connected in series in order to minimise the total number of switching devices required. Thus it is contemplated that the machine may have its armature conductors accommodated in slots in a stator armature which resembles that of an A.C. synchronous machine but in which the armature conductors are interconnected into armature paths which are in wave-wound formation extending over pole pitches without progression, there being an integral number of armature slots, and thence conductors, per pole and an equal number of complete paths. The possibility of using a permanent magnet rotor then gives rise to a machine with the mechanical advantages of a squirrel cage A.C. induction machine but with the characteristics and control facilities of a D.C. machine. With the foregoing preferred arrangement of the armature conductors the switching devices would be controlled so that, as regards each armature conductor, its effective connection between the armature terminals would be in one sense whilst within the influence of a field pole of one polarity and in the reverse sense whilst within the influence of a field pole of the opposite polarity, the switching devices controlling these connections of the conductor being in their off conditions whilst the conductor is between poles. Consequently, since the absence of mechanical commutation means that compoles are no longer required between the main poles and that close main pole spacing can therefore be achieved, each switching device will be conducting ("on") for almost half of each rotation through 360° electrical: that is, its alternate on and off periods will approach equality as required for maximum power handling. Moreover since current in the armature conductors is interrupted (switching devices off) while they are between poles, maximum use is made of these conductors.

In order that the armature conductors shall carry substantially equal currents when connected in parallel by the switching devices, the motional E.M.F. generated in them must be sensibly equal and constant as they pass through the influence of a field pole. This calls for constant flux density over the pole face, and this may be achieved by means of pole face windings which provide compensation for armature reaction effects: alternatively a saturated field may be used, although this would lead to some limitation of application. The current overloads which may be accommodated are then limited by the current rating of the semi-conductor devices and not by machine non-linearity. In practice, armature conductor current may be kept substantially uniform by timing the actuation of the switching devices so that each conductor is switched into and out of circuit where reasonably constant field flux begins and ends.

In a conventional D.C. machine the commutation problem concerns the reversal of current in the armature conductors while short-circuited by a brush engaging adjacent commutator segments. With commutation effected according to the present invention there is no difficulty in starting the current through an armature conductor but it is important to eliminate the (reverse) transient voltage occurring as the current is extinguished. This may readily be done by shunting the main current path through each switching device by a rectifier poled to conduct current in the direction opposite to that of the current flow through the switching device.

In order that the invention may be more fully understood there will now be described by way of specific example two circuits for effecting, in respect of a single armature current path of a D.C. motor, commutating switching in accordance with the invention; similar circuits may be assumed to be employed for all other such paths of the motor, the actuation of the switching devices in the several circuits being appropriately timed in relation to each other according to the relative angular position of the armature with respect to the main field system of the motor.

In describing those exemplary circuits and their application to a D.C. motor, reference will be made to the accompanying drawings in which.

Figure 1:
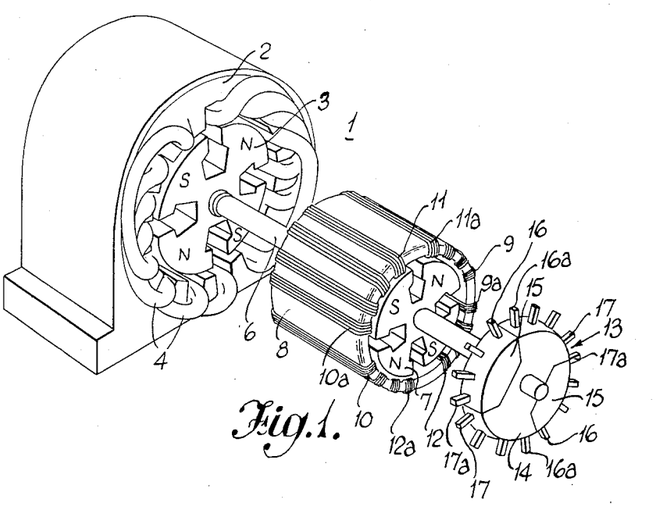
FIG. 1 is a diagrammatic representation of a D.C. motor having a construction made possible by the provision of commutation switching in accordance with the invention, the motor being shown with certain auxiliary devices which are required for the purposes of a commutating switching circuit such as that of FIG. 4 or FIG. 5.

Referring firstly to FIG. 1, a D.C. motor 1 provided with semi-conductor commutation switching in accordance with the invention may comprise a stator armature 2 and a rotor field system 3, which field system may with advantage be a permanent magnet system as has been assumed for FIG. 1. The armature conductors 4 are laid in slots in the manner of a synchronous induction motor and are connected, as indicated in the upper part of FIG. 4, into a wave-wound formation comprising a number of paths, such as 5, each made up of a series connection of conductors spaced from each other by a pole pitch, there being an integral number of conductors per pole and an equal number of complete paths. A four-pole, four-path motor has been taken for the purposes of illustration. The shaft 6 of the motor 1 carries an auxiliary four-pole field system 7 which is assumed for the moment to be a permanent magnet system and co-operates with a pick-up device 8 having pick-up coils such as 9, 10, 11 and 12 in which the field system 7 induces actuating signals required for controlling the semi-conductor devices which effect commutation in accordance with the invention. The relative disposition of the pick-up coils in relation to the field system 7 will be described later, as will also be the function of an auxiliary mechanical switching device 13 also mounted on the motor shaft 6. For the present it will suffice to say that the switching device 13 comprises, for a four-pole machine, a conductive disc 14 which has non-conductive inserts 15 and co-operates with a number of circumferentially distributed pairs of brushes or other contacts such as 16—16 and 17—17 bearing commutator-wise on the edge of the disc. The action of the disc 14 and its inserts 15, as the disc rotates with the motor 1, is that it alternately establishes and interrupts connection between the two contacts of each of the several pairs in sequence, the contacts of each pair being alternately interconnected and disconnected for about a quarter of a revolution at a time.

Figure 2:
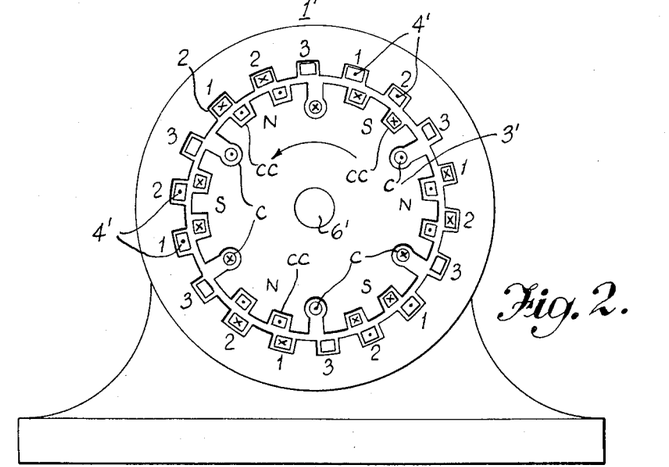
FIGS. 2 and 3 illustrate in schematic cross-section alternative field and armature arrangements made possible by the provision of commutation switching in accordance with the invention.

As an alternative to the D.C. motor of FIG. 1, a motor having an electromagnetic rotor field system may be provided with commutation switching in accordance with the invention: in FIG. 2 there is illustrated in diagrammatic cross-section the armature and field system arrangements of such a motor. The motor 1' carries on its shaft 6' an electromagnetic rotor field system 3' which has 6 poles energised by main field winding c to which exciting current, flowing in the directions conventionally indicated by the dots and crosses, is fed through suitable sliprings and co-operating brush contacts (not shown). As in FIG. 1, armature conductors 4' of the stator armature 2' are laid in slots distributed around the inner periphery of the motor frame for interaction with the field system 3', correspondingly numbered armature conductors being interconnected to form the different armature current paths. In order that a substantially constant flux density is achieved over the whole of each pole face of the field system 3', armature reaction compensating windings cc are provided on each pole.

Figure 3:
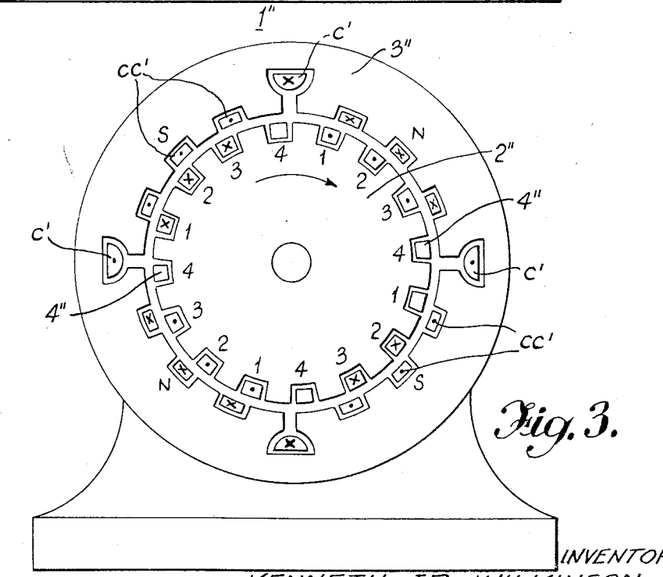

Another possible alternative to the D.C. motor of FIG. 1 is shown in FIG. 3 where there is illustrated, again in diagrammatic cross-section, the armature and field system arrangements of a four-pole D.C. motor 1" having a rotor armature and stator electromagnetic field system. In this figure, the rotor armature 2" is provided with four armature current paths constituted by correspondingly numbered armature conductors 4", which are located in slots distributed around the outer periphery of the armature 2", while the main field system 3" of the motor 1" is provided on the motor frame and has normal energising windings c' together with compensating windings cc'.

Figure 4:
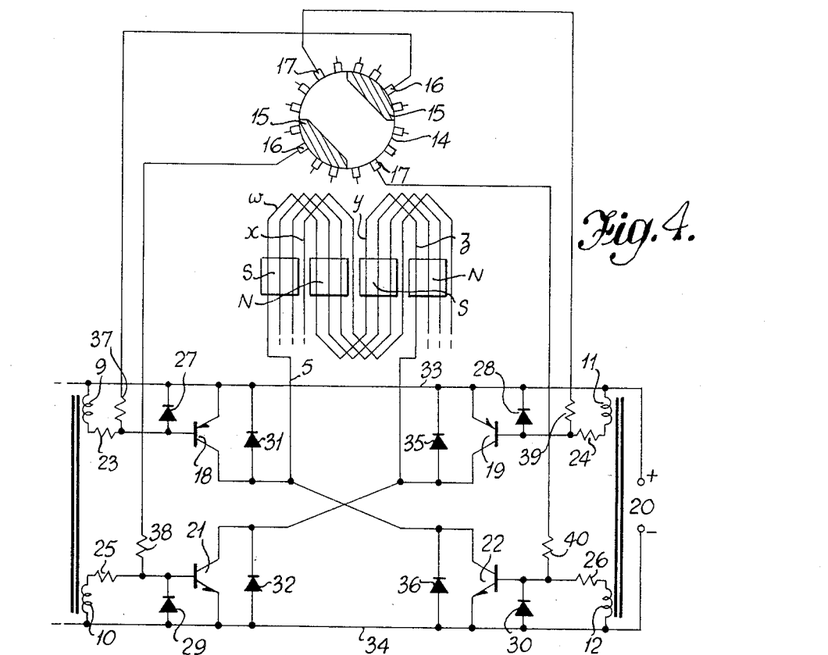
FIG. 4 illustrates a commutating switching circuit employing transistors.

FIG. 4 illustrates a commutating switching circuit for a single armature path 5 constituted by armature conductors w, x, y, z (FIG. 4), it being appreciated that the other armature paths would be provided with similar circuits having appropriately different timing for their commutating switching actions. For example, if the pick-up coils 9, 10, 11 and 12 of the pick-up device 8 (FIG. 1), and the contacts 16—16 and 17—17 of the switching device 13 relate to the armature path 5, then intermediate coils such as 9a, 10a, 11a and 12a and intermediate contacts such as 16a—16a and 17a—17a could relate to an armature path such as 5a comprising conductors spaced a quarter of a pole pitch from the conductors w, x, y, z of the path 5.

Referring now to FIG. 4, and assuming that the motor is to be energised from a two-wire D.C. supply system (not shown) connected at terminals 20, the circuit shown employs two p-n-p transistors 18 and 19 through which opposite ends of the armature current path 5 are connected to the positive terminal 20 and two n-p-n transistors 21 and 22 through which the ends of the path 5 are also respectively connected to the negative terminal 20: the emitter of the transistor is in each case connected to the corresponding terminal of the source 20 and the collector is connected to the relevant end of the path 5. Between the base and the emitter of each of the transistors 18 and 19 is connected the pick-up coils 9 or 11 in series with a resistor 23 or 24; likewise between the base and the emitter of each of the transistors 21 and 22 is connected the pick-up coils 10 or 12 in series with a resistor 25 or 26. The pick-up coils 9 and 10, constituting one pair, and likewise the pick-up coils 11 and 12, constituting another pair, co-operate as already explained, with an auxiliary field system 7 (FIG. 1) of alternate north and south poles which rotates with the motor. The pick-up coils, in co-operation with the field system 7, serve as control means for the transistors 18, 19, 21 and 22, and each coil pair is positioned in relation to the field system 7 so that both the coils of the pair are influenced by the same polarity of magnetic field at any time. As a result of such influence, the pick-up coils 9 and 10 or 11 and 12 of each pair tend to inject into the bases of their associated transistors, 18 and 21 or 19 and 22, currents which are respectively positive and negative, or negative and positive, depending on the particular polarity of the magnetic field by which the coils are at the time being influenced. The two pairs of pick-up coils 9, 10 and 11, 12 are arranged so that as one pair is being influenced by one polarity of magnetic field the other pair is being influenced by a magnetic field of the opposite polarity. Positive current is diverted from the bases of the p-n-p transistors 18 and 19 by respective rectifiers 27 and 28 connected, in each case, between the emitter and base of the appertaining transistor and poled toward the emitter, while negative current is similarly diverted from the bases of the n-p-n transistors 21 and 22 by respective rectifiers 29 and 30, also connected in each case between the emitter and base of the appertaining transistor but, in this instance, poled toward the base.

The field system associated with the pick-up coils is so synchronised with the rotation of the motor that, in the case of the path 5 for example, when an armature conductor included in that path, say x, comes within the influence of a N-pole, for instance, of the rotor field system 3 (FIG. 1) of the motor, the pair of pick-up coils 9, 10 comes under the influence of a N-pole of the field system 7, and injects respective negative and positive currents into the bases of the associated p-n-p and n-p-n transistors 18 and 21 at opposite ends of the current path 5. Consequently, these transistors 18 and 21 are rendered conductive and current flows through the current path 5, with the result that the armature conductor under the N-pole, and likewise the other conductors in the path 5, experience a force which causes the motor to rotate in the usual way. At this time a S-pole is influencing the pick-up coils 11 and 12 which thus ensure non-conduction of their appertaining transistors 19 and 22. Just before the armature conductor x being considered leaves the influence of the N-pole, the influence on the pair of pick-up coils 9, 10 of the passing N-pole of the field system 7 becomes reduced to an extent such that the current injected into the bases of the conductive transistors 18 and 21 effectively ceases and these transistors become non-conductive. The energy stored in the self-inductance of the armature conductors then builds up to an E.M.F. which attempts to promote continued flow of armature currents, and when this E.M.F. exceeds the terminal voltage of the source connected to terminals 20, rectifiers 31 and 32, respectively shunting the transistors 18 and 21, are caused to conduct. Much of the stored energy is thereby fed into the busbars or other supply connections 33 and 34 connected to the terminals 20. As the armature conductor x thereafter comes under the influence of a S-pole of the main magnetic field system 3 of the motor, the other pair of pick-up coils 11 and 12 become influenced by a N-pole of the field system 7 and the two transistors 19 and 22 are thereby brought into conduction. Armature current therefore again flows, but this time in the opposite direction, as is required in order that the force experienced by the armature conductor will act in the correct direction to continue the rotation of the motor. As the armature conductor x leaves the influence of the S-pole, the transistors 19 and 22 are rendered non-conductive, and the armature current thereby stopped, by reduction of the current injected into their bases by the pick-up coils 11 and 12 as the latter are removed from the influence of the N-pole of the field system 7. The E.M.F. built upon the cessation of armature current in this direction of flow is diverted from the transistors 19 and 22 by respective rectifiers 35 and 36 by which they are shunted. The switching cycle is thereafter repeated, a N-pole of the field system 7 causing conduction of one transistor pair while a S-pole prevents conduction of the other transistor pair.

If the motionally generated armature E.M.F. at any time exceeds the voltage of the source connected to terminals 20, for instance when the motor is being used as a brake, the rectifier pairs 31, 32 and 35, 36, shunting the controlled transistor pairs 18, 21 and 19, 22, will conduct alternately as the armature conductors in the path 5 come under the influence of poles of opposite polarity: the motor will then act regeneratively as an alternator feeding current to the busbars 33 and 34 via a bridge rectifier constituted by the rectifiers 31, 32, 35 and 36.

The two pairs of pick-up coils 9, 10 and 11, 12 function as described only at motor speeds above a certain minimum. To provide the requisite switching action through the transistor pairs 18, 21 and 19, 22 below this minimum speed and at standstill, when the field system 7 associated with the pick-up coils is unable to cause the latter to actuate the transistors, there is provided the auxiliary mechanical switching device 13 which, as aforesaid, rotates with the motor and has a conductive disc 14 with non-conductive inserts 15 suitably phased with respect to each other. At speeds at which the pick-up coils are effective a centrifugal device (not shown) may render the switching device 13 ineffective, but below these speeds the switching device 13 becomes effective to interconnect through its conductive disc 14 the several pairs of contacts 16—16, 16a—16a, 17—17, 17a—17a, and so on. The two contact pairs 16—16 and 17—17 associated with the commutating switching circuit for the path 5, and likewise the two contacts pairs associated with commutating switching circuit for each other path, are so circumferentially distributed around the device 13 that when one pair is interconnected by the disc 14, the non-conductive inserts 15 prevent interconnection of the other pair. In the circuit being considered, therefore, the contact pairs 16—16 and 17—17 become interconnected, alternately, and thereby interconnect the bases of the transistor pairs 18, 21 and 19, 22 during the periods for which, in respect of each pair, the transistors of the pair, one p-n-p the other n-p-n, are required to be conductive. The interconnection of the bases of the pair of transistors 18 and 21 and likewise of the other pair of transistors 19 and 22, is effected through respective resistor pairs 37, 38 and 39, 40, and establishes across the terminals 20 in respect of each transistor pair a potential dividing chain comprising the pick-up coils 9 and 10, or 11 and 12, the resistors 23 and 25, or 24 and 26, and the resistors 37 and 38, or 39 and 40. The resistance values of the components in this chain are chosen so that the points at which the bases of the transistors are connected to it are such that negative current is injected into the base of the p-n-p transistor (18 or 19) of the pair while positive current is injected into that of the n-p-n transistor (21 or 22) resulting in both the transistors of a pair being rendered conductive during the period that the base interconnection of the transistors by the mechanical switching device 13 is established.

Figure 5:
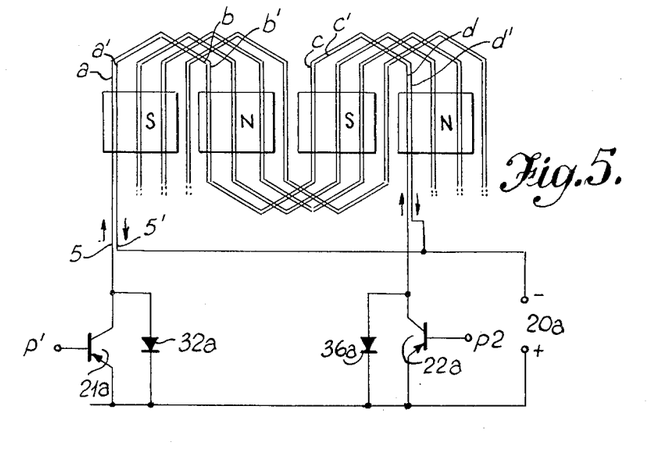
FIG. 5 illustrates an alternative commutating switching circuit employing transistors.

An alternative commutating switching circuit is shown in FIG. 5 for a pair of armature current paths 5, 5' constituted respectively by armature conductors a, b, c, d, and a', b', c', d', each pair of armature conductors such as a, a' in the two paths being assumed located in the same slot on the armature: similar circuits are assumed to be provided for the other pairs of paths. It is arranged that the switching circuit establishes current flow through the two paths of the pair alternately, in the directions indicated by the arrows and at such times that as regards each pair of conductors such as a, a', say, the conductor a carries current when under a S-pole and the conductor a' carries current when under a N-pole. To achieve this the armature current paths 5, 5' are connected at one end directly to the negative terminal 20a and at the other end to the positive terminal 20a through respective transistors 21a and 22a. In each case the emitter of the transistor is connected to the positive terminal 20a and the collector to the appertaining path, but since one transistor is connected to the end of its path opposite that at which the transistor for the other path is connected, conduction of the transistors 21a and 22a will cause current flow to be established through their respective paths in opposite directions. The transistors 21a and 22a are rendered conductive, at appropriate times giving proper direction of current flow, by actuating pulses applied to their bases by way of input terminals p1 and p2, such pulses being derived, for instance, from pick-up coils and a co-operating rotating field system similar to that employed for the circuit of FIG. 4. Shunting rectifiers 32a and 36a are provided across the transistors 21a and 22a as before.

Figure 6:
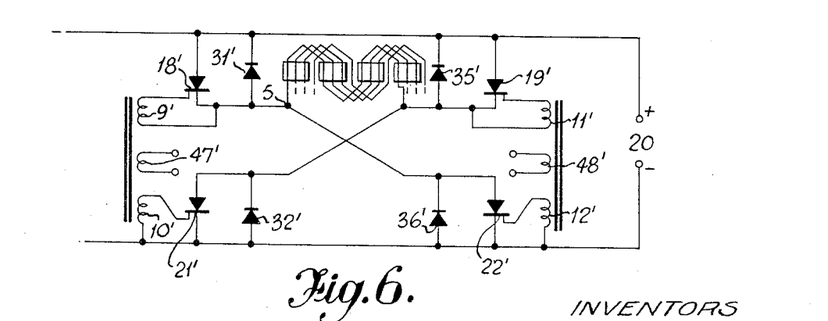
FIG. 6 illustrates a commutating switching circuit employing trigger diodes.

The circuit of FIG. 6 employs so-called "trigger-diode" semi-conductors instead of the transistors employed in the circuit of FIGS. 4 and 5 just described. A trigger diode is a semi-conductor device which is comparable in its operation to the well-known thyratron in that it can be switched on (that is, rendered conductive) by the application of a pulse to a trigger electrode thereof but can be switched off only by interrupting, or otherwise externally stopping, the current flow in its main current path. Trigger diodes, which are more recent devices than transistors, have a power handling capacity which seems likely, with further development, to be greater than that of comparable transistors. It will be appreciated that transistors and trigger diodes can be considered generically as semi-conductor switching devices having input and output electrodes at which the current flows respectively into and out of the device when it is "on," that is, conductive, and a control electrode by the application to which of an appropriate actuating signal the device can be switched on, that is, rendered conductive. In the case of a trigger diode the input and output electrodes are the two electrodes which constitute the diode and the control electrode is the trigger electrode. In the case of a transistor, the control electrode is the base electrode and the input and output electrodes are respectively either the emitter and collector electrodes (p-n-p transistor) or the collector and emitter electrodes (n-p-n transistor).

Referring to FIG. 6, in which the components of the circuit therein have primed references corresponding, as far as possible, to the references of corresponding components in FIG. 4, the armature current path 5 in this circuit is connected at its opposite ends to the positive and negative terminals 20 through respective trigger diodes 18' and 21' for current flow through the path 5 in one direction, and also through respective trigger diodes 19' and 22' for current flow through the path 5 in the opposite direction. Each pair of trigger diodes 18', 21' and 19', 22' is associated with a pair of pick-up coils 9', 10' and 11', 12' influenced, as before, by a rotating field system 7 (FIG. 1), these coils being effective, at appropriate times, to apply trigger pulses to the related pair of trigger diodes and thereby initiate their conduction in order to establish armature current flow through the path 5 in a given direction.

To interrupt the current in the path 5 as the conductors therein leave the influence of a pole of the main field system of the motor, the flux of this field may be increased locally at the trailing pole tips so that, as the conductors of the path 5 move past a pole tip, the E.M.F.'s generated in them will then exceed the voltage at terminals 20, this latter voltage corresponding to the E.M.F.'s generated in the other conductors plus the IR voltage drops and the semi-conductor voltage drops associated with them. The current will therefore try to reverse, and in doing so it will be reduced to zero, so that the previously conductive pair of trigger diodes 18', 21' or 19', 22' will automatically be extinguished. As in the circuit in FIG. 4, shunting rectifiers 31', 32' and 35', 36' are included to allow for regenerative braking.

Figure 7:
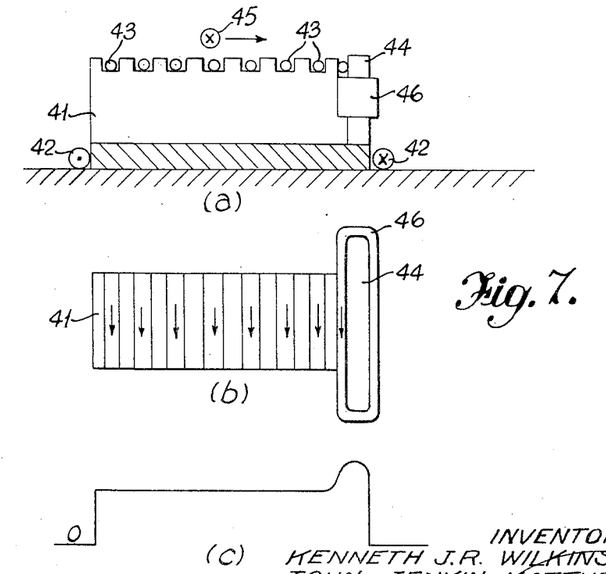
FIG. 7 schematically illustrates methods for locally increasing the field flux at the tip of a pole of the field system of a D.C. motor.

In order to explain how an increase of field flux at the trailing tip of a pole may be achieved reference will now be made to FIG. 7 in which (a) is a diagrammatic side view of a pole, (b) is a plan view of (a), and (c) is a graph representing the flux field produced by the pole. In FIGS. 7(a) and (b) the pole 41 has been assumed to form part of an electromagnetic field system, being embraced by an excitation coil 42 and being provided in its ing would apply equally to a pole of a permanent magnet pole face with compensating windings 43, but the following would apply equally to a pole of a permanent magnet field system. At the trailing tip 44 of the pole 41, the pole face is slightly stepped so that the pole tip is somewhat proud of the remainder of the pole face and the air gap between the pole 42 and a co-operating armature (represented by a single conductor 45) is therefore smaller at the tip than elsewhere, thereby achieving a local increase of flux. In some circumstances this method of locally increasing the flux might have disadvantages in the overall design of the field system and one may therefore prefer, instead or in addition, to widen the pole tip 44 beyond the sides of the pole as shown at (b). Another possible way of locally increasing the flux is to provide a D.C. excited auxiliary winding 46 on the pole tip 44. At low speeds or at standstill, when there is little or no motionally generated E.M.F., A.C. excitation of the trailing pole tip 44 may be provided by applying alternating current of suitable frequency either through the auxiliary winding 46 or through a separate A.C. excitation winding (not shown): this A.C. excitation, which would be removed for higher speeds of operation at which it is unnecessary, would ensure that at low speed or standstill the current in a passing armature conductor such as 45 would be reduced to zero at some instant during the time it is within the region of the trailing pole tip 44.

For a similar reason the field system cooperating with the pick-up coils 9', 10', 11', 12' may, if electromagnetic in nature, be excited with alternating current for starting up the motor. Alternatively, as shown in FIG. 5, triggering pulses for a selected pair of trigger diodes 18', 21' and 19', 22' could be introduced into the pick-up coil pairs 9', 10' and 11', 12', by means of respective starting windings 47' and 48' with which the pick-up coil pairs are inductively coupled.

For three-wire operation the switching devices connected to one end of the path 5 in FIG. 4 or FIG. 6, for instance the devices 18 or 18' and 22 or 22' together with the other components individually associated with them, could be omitted and that end of the path connected directly to the third (neutral) terminal for the D.C. supply: the auxiliary switching device 12 (FIG. 4) could then be arranged to establish for the bases of the remaining devices 19 and 21, potential dividing resistance chains connected across the supply terminals 20 either directly or through the remaining pick-up coils 11 and 10.

It will be appreciated that with each of the commutating switching circuits described it is not possible to reverse the polarity of the voltage supply to the armature terminals, this being fixed because of the unidirectional conduction of the semi-conductor switching devices employed. With an electromagnetic field system for the motor, the direction of rotation of the motor can be changed by reversing the polarity of the motor field supply voltage. In the case of a permanent magnet motor field, reversal of rotation could be achieved, as also in the case of an electromagnetic field system, by reconnecting the pairs of the pick-up coils so that, as regards each armature current path, they then control the other pair of semi-conductor devices: a similar reconnection of the contact pairs, such as 16—16 and 17—17, of the auxiliary switching device 13 in FIG. 1, would also be effected in these circumstances. Alternatively, the relative angular positions of the pick-up coils and their associated field system 7 (FIG. 1) could be displaced through one pole pitch for a given angular position of the motor armature: the contact pairs of the auxiliary mechanical switching device, where provided, would also be displaced through a corresponding angle, or a second conductive disc of the switching device, having non-conductive inserts appropriately phased with respect to those of the first disc, may be brought into use as by axially displacing the conductive discs in order to take the first one out of engagement with the co-operating contacts and bring the other one into engagement with them.

What we claim is:

1. A dynamo-electric D.C. motor comprising positive and negative supply terminals; an armature having armature conductors connected to form at least one armature current path between said supply terminals; a co-operating magnetic field system having at least two poles; a pick-up device comprising a plurality of pick-up coils; an auxiliary field system mounted rotatably with the motor and co-operating with said coils; and a commutating switching circuit comprising for each end of each armature current path two semi-conductor switching devices each having input and output electrodes and a control electrode, one of said switching devices at each end of said path having its output electrode connected to that end of the path and its input electrode connected to the positive supply terminal, while the other said switching device at each end has its input electrode connected to that end and its output electrode connected to the negative supply terminal, and the control electrodes of said switching devices being connected to respective ones of said pick-up coils which are so arranged and connected that said auxiliary field system induces in said coils, in periodic sequence and at appropriate times during rotation of the motor, actuating signals which cause one pair of said devices, namely one of the devices which has its input electrode connected to an end of the path and the device which has its output electrode connected to the other end of the path, to be periodically rendered conductive together to establish current flow through said path in one direction, and the remaining pair of said devices also to be rendered conductive together, when the devices of the first pair are non-conductive, to establish current flow through the path in the opposite direction.

2. A dynamo-electric D.C. motor comprising positive and negative supply terminals; an armature having armature conductors connected to form at least one armature current path between said supply terminals; a co-operating magnetic field system having at least two poles; a pick-up device comprising a plurality of pick-up elements and a co-operating activating system mounted rotatably with the motor and co-operating with said pick-up elements to periodically produce actuating signals therefrom during rotation of the motor; and a commutating switching circuit comprising for each end of each armature current path two semi-conductor switching devices each having input and output electrodes and a control electrode, one of said switching devices at each end of said path having its output electrode connected to that end of the path and its input electrode connected to a positive supply terminal while the other device at each end has its input electrode connected to that end and its output electrode connected to the negative supply terminals, and the control electrodes of said switching devices being connected to respective ones of said pick-up elements so arranged and connected that the co-operating activating system produces from said elements, in periodic sequence and at appropriate times during rotation of the motor, actuating signals which cause one pair of said devices, one having its input electrode connected to an end of the path and the other having its output electrode connected to the other end of the path, to be periodically rendered conductive together to establish current flow through the path in one direction, and the remaining pair of said devices also to be rendered conductive together, when the devices of the first pair are non-conductive, to establish current flow through the path in the opposite direction.

3. A dynamo-electric D.C. motor comprising positive and negative supply terminals; an armature; armature conductors accommodated in slots in said armature and connected to form at least one armature current path between said supply terminals; a co-operating magnetic field system having at least two poles; a pick-up device comprising a plurality of pick-up elements and a co-operating activating system mounted rotatably with the motor and co-operating with said pick-up elements to periodically produce actuating signals therefrom during rotation of the motor; and a commutating switching circuit comprising for each end of each armature current path two semi-conductor switching devices each having input and output electrodes and a control electrode, one of said switching devices at each end of said path having its output electrode connected to that end of the path and its input electrode connected to a positive supply terminal while the other device at each end has its input electrode connected to that end and its output electrode connected to the negative supply terminals, and the control electrodes of said switching devices being connected to respective ones of said pick-up elements so arranged and connected that the co-operating activating system produces from said elements, in periodic sequence and at appropriate times during rotation of the motor, actuating signals which cause one pair of said devices, one having its input electrode connected to an end of the path and the other having its output electrode connected to the other end of the path, to be periodically rendered conductive together to establish current flow through the path in one direction, and the remaining pair of said devices also to be rendered conductive together, when the devices of the first pair are non-conductive, to establish current flow through the path in the opposite direction.

4. A dynamo-electric D.C. motor according to claim 3 in which the armature paths into which the slot-accommodated armature conductors are interconnected have a wave-wound formation extending over pole pitches without progression, there being an integral number of slots and of conductors per pole and an equal number of complete paths.

5. A dynamo-electric D.C. motor comprising: an armature having slot-accommodated armature conductors connected to form instead of said at least one armature path in the motor according to claim 3, at least one pair of such armature paths having their constituent conductors accommodated in the same slots; a co-operating field system having at least two poles; positive and negative supply terminals; a pick-up device comprising a plurality of pick-up elements and a co-operating activating system mounted rotatably with the motor and co-operating with said pick-up elements to periodically produce actuating signals therefrom during rotation of the motor; and a commutating switching circuit comprising for the armature paths of said pair respective semi-conductor switching devices having input and output electrodes and a control electrode, one of said switching devices having its input and output electrodes connected the one to its armature path at one end thereof and the other to one of the supply terminals selected according to the particular electrode connected thereto, while the other of said switching devices has its input and output electrodes likewise connected the one to its armature path at the other end thereof and the other to the same supply terminal, the control electrodes of said switching devices for said pair of armature paths being connected to respective ones of said pick-up elements so arranged and connected that the co-operating activating system produces from said elements, in periodic sequence and at appropriate times during rotation of the motor, actuating signals which cause one of said switching devices to be periodically rendered conductive to establish current flow through its path in one direction, and the other switching device also to be rendered conductive, when the first is non-conductive, to establish current flow through the other path in the opposite direction.

6. A dynamo-electric machine with commutating means as claimed in claim 2, wherein each switching device is shunted by a rectifier poled to conduct current in the direction opposite to that of the current flow through the switching device.

7. A dynamo-electric D.C. machine having commutating means according to claim 2, said machine comprising; a stator armature carrying said armature conductors; a permanent magnet rotor field system having at least one pair of north and south poles co-operating with said stator armature; an auxiliary field system mounted rotatably with said rotor field system and having the same number of pole pairs as that field system; and an electrical pick-up device comprising a plurality of pick-up coils with which the auxiliary field system co-operates to produce actuating signals by which the semi-conductor switching devices are controlled with the timing and sequence required for effecting the commutation.

8. A dynamo-electric D.C. machine having commutating means according to claim 2, said machine comprising; a stator armature carrying said armature conductors; an electromagnetic rotor field system having at least one pair of north and south poles co-operating with said stator armature, which field system comprises main magnetizing windings together with compensating windings providing substantially equal flux distribution in the field system pole faces; an auxiliary field system mounted rotatably with said rotor field system and having the same number of pole pairs as that field system; and an electrical pick-up device comprising a plurality of pick-up coils with which the auxiliary field system co-operates to produce actuating signals by which the semi-conductor switching devices are controlled with the timing and sequence required for effecting the commutation.

9. A dynamo-electric D.C. machine having commutating means according to claim 2, said machine comprising; a rotor armature carrying said armature conductors; a stator electromagnetic field system having at least one pair of north and south poles co-operating with said rotor armature, which field system comprises main magnetizing windings together with compensating windings providing substantially equal flux distribution in the field system pole faces; an auxiliary field system mounted rotatably with said rotor armature and having the same number of pole pairs as the stator field system; and an electrical pick-up device comprising a plurality of pick-up coils with which the auxiliary field system co-operates to produce actuating signals by which the semi-conductor switching devices are controlled with the timing and sequence required for effecting the commutation.

10. A dynamo-electric D.C. motor comprising positive and negative supply terminals; an armature having armature conductors connected to form at least one armature current path between said supply terminals; a co-operating field system having at least two poles; a pick-up device comprising a plurality of pick-up coils; an auxiliary field system mounted rotatably with the motor and co-operating with said pick-up coils; and a commutating switching circuit comprising for each armature current path two p-n-p transistors and two n-p-n transistors each having emitter, collector and base electrodes, the two p-n-p transistors having their emitters connected to the positive supply terminal, their collectors respectively connected to opposite ends of said current path and their bases connected to respective ones of said pick-up coils, while the two n-p-n transistors have their emitters connected to the negative supply terminal, their collectors respectively connected to the opposite ends of said current path and their bases connected to respective other ones of said pick-up coils; and the pick-up coils to which the bases of said transistors are connected being so arranged and connected that said auxiliary field system induces in them, in periodic sequence and at appropriate times during rotation of the motor, actuating signals which cause one of the p-n-p transistors and one of the n-p-n transistors, at opposite ends of the current path, to be periodically rendered conductive together to establish current flow through the path in one direction, and the remaining p-n-p transistor and n-p-n transistor also to be rendered conductive together, when the first two are non-conductive, to establish current flow through the path in the opposite direction.

11. A dynamo-electric D.C. motor as claimed in claim 10, including for low speed operation a mechanical switching device mounted rotatably with the motor and effective to periodically and alternately establish across the supply terminals two potential dividing chains to one of which are connected the bases of one of the p-n-p transistors and one of the n-p-n transistors, at opposite ends of said current path, and to the other of which are connected the bases of the remaining p-n-p transistor and n-p-n- transistor, each divider chain, when established, being effective to produce conduction of the transistors connected to it.

12. A dynamo-electric D.C. motor as claimed in claim 10, wherein each transistor in said commutating switching circuit has a rectifier connected between its emitter and collector, which rectifier is poled to conduct current in the direction opposite to that of current flow through the transistor.

13. A dynamo-electric D.C. motor comprising; positive and negative supply terminals; an armature having armature conductors connected to form at least one armature current path between said supply terminals; a co-operating magnetic field system having at least two poles; a pick-up device comprising a plurality of pick-up coils; an auxiliary field system mounted rotatably with the motor and co-operating with said pick-up coils; and a commutating switching circuit comprising for each armature current path four semi-conductor trigger diodes of which two are connected in series between the positive and negative supply terminals and have one end of said path connected to the junction between them, and the other two are likewise connected in series between the positive and negative supply terminals and have the other end of said path connected to the junction between them, all of said trigger diodes being poled to pass current in the direction from the positive towards the negative terminal and having respective trigger electrodes connected to respective ones of the pick-up coils to receive therefrom in periodic sequence and at appropriate times during rotation of the motor, actuating signals induced into them by said auxiliary field system and effective to cause one trigger diode at each end of the path to be periodically rendered conductive together to establish current flow through the path in one direction, and to cause the other two trigger diodes also to be rendered conductive together, when the first two are non-conductive, to establish current flow through the path in the opposite direction.

14. A dynamo-electric D.C. motor as claimed in claim 11, wherein each said trigger diode has connected across it a rectifier poled to conduct current in the direction opposite to that of current flow through the trigger diode.

References Cited in the file of this patent
UNITED STATES PATENTS

| | | |
|---|---|---|
| 1,813,056 | Kern | July 7, 1931 |
| 1,908,364 | Kern | May 9, 1933 |
| 2,719,944 | Brailsford | Oct. 4, 1955 |